(12) United States Patent
Urban et al.

(10) Patent No.: US 7,801,364 B2
(45) Date of Patent: Sep. 21, 2010

(54) MULTI-MEDIA APPARATUS WITH JPEG 2000 COMPRESSION AND AUTOFOCUS

(75) Inventors: Randall Lee Urban, Louisburg, KS (US); David Carroll Owen, Olathe, KS (US); Steven Eric Hathaway, Lenexa, KS (US)

(73) Assignee: ICOP Digital, Inc., Lenexa, KS (US)

( * ) Notice: Subject to any disclaimer, the term of this patent is extended or adjusted under 35 U.S.C. 154(b) by 934 days.

(21) Appl. No.: 11/537,685

(22) Filed: Oct. 2, 2006

(65) Prior Publication Data
US 2008/0080776 A1 Apr. 3, 2008

(51) Int. Cl.
*G06K 9/36* (2006.01)
(52) U.S. Cl. .................................. 382/232; 382/233
(58) Field of Classification Search .......... 382/232, 382/233, 247, 248, 282; 345/472; 348/169, 348/273, 143, 155, E7.086; 375/240.25, 375/240.28; 358/538; 725/105; 340/945
See application file for complete search history.

(56) References Cited

U.S. PATENT DOCUMENTS

| | | | |
|---|---|---|---|
| 6,970,183 B1 * | 11/2005 | Monroe | 348/143 |
| 7,131,136 B2 * | 10/2006 | Monroe | 725/105 |
| 7,162,101 B2 * | 1/2007 | Itokawa et al. | 382/282 |
| 7,296,286 B2 * | 11/2007 | Osawa | 725/105 |

* cited by examiner

*Primary Examiner*—Anh Hong Do
(74) *Attorney, Agent, or Firm*—Ladi O. Shogbamimu (57) ABSTRACT

The present invention is directed to a surveillance device that provides a wide range of monitoring and is adapted to log and transmit video, audio, collateral environment data, and event data over a network, utilizing a relatively low bandwidth and low power consumption, while maintaining a resolution and features that greatly enhance surveillance applications. The multimedia surveillance device of the present invention provides support for dynamic addressing, JPEG 2000 compression, auto-focus and alarm notification.

16 Claims, 4 Drawing Sheets

MULTI-MEDIA APPARATUS WITH JPEG 2000 COMPRESSION AND AUTOFOCUS

The present invention is directed to a multi-media apparatus having compression processing, auto focus and network capability. The multi-media apparatus provides surveillance and a range of monitoring options to devices on a digital network.

BACKGROUND OF THE INVENTION

Security issues and other motivations for surveillance continue to drive wide scale deployment of systems that can provide monitoring in vehicles, buildings, parking lots and other areas. In some of these systems it is necessary to transmit acquired information to central monitoring locations or to other devices. It is also the case that in some situations, it would be advantageous to have the ability to provide remote monitoring or access to non-party entities. Such non-party entities include law enforcement or emergency service agencies. Current systems are typically closed systems and tend to have proprietary communication schemes and thus provide limited access to data. These closed systems do not lend themselves to scalable widespread deployment or provide the opportunity for open access communication.

Presently, most surveillance systems provide video data and in a few cases, there is also some audio data. However, in certain surveillance or reconnaissance situations, it might be beneficial to obtain other environmental conditions and data, which current systems do not provide. It is thus desirable to have a system that can acquire a wide variety of multi-media and environmental data, and compress such data so that it can be transmitted over a communication channel without requiring a large bandwidth. More specifically, it is desirable to have an audio/video device that incorporates sensors that can monitor and respond to environmental conditions, in order to provide a more complete audio, visual and sensory impression of the device's locale or vicinity.

A great number of currently deployed surveillance systems are primarily based on analog cameras, with more recently deployed systems being based on digital cameras. The analog systems have the draw back of having a resolution that is fixed by the implemented video standard, such as National TV Standards Committee (NTSC)/Phase Alternating Line (PAL)/SEquential Couleur Avec Memoire, Sequential Color with Memory (SECAM). In analog systems, finer details of a scene may be inspected by optical zoom and some form or mechanical tilt and pan of the camera. However, resolution and clarity of images may be lost. As such, digital cameras are being implemented on a wider scale for surveillance systems.

Although existing digital camera based systems addressed the short comings of the analog cameras they also suffer from set backs of their own despite some of the advances that have been made. For example, existing digital cameras, that are network enabled, utilize packet oriented digital image transmission. High resolution video surveillance systems were developed with video rate multi-format functionality and instantaneous pan, tilt and zoom capability. Some digital systems also incorporated image processing capabilities, compression and network transmission. However, these video compression techniques have involved two basic forms of compression processing—spatial and temporal.

Spatial processing compresses information by transforming the picture elements within a particular frame of a video signal in accordance with a compression algorithm, thereby reducing the amount of information required for reproduction of the frame.

Temporal processing incorporates information relating to how information is changing with time. In other words, it reduces the amount of information for picture reproduction of a frame by tracking changes that occur from frame to frame. Specifically, changes are reflected in vectors that are generated and transmitted rather than the actual contents of video frames. More detailed descriptions of spatial and temporal processing can be found in several references within the art.

One compression technique that has been used in the art is the MPEG compression standard, which incorporates both the spatial and temporal processing techniques. However, movement information must be extracted in order to provide motion vectors. The extraction and processing required for conveying information requires relatively large amounts of memory space and computational power. Furthermore, these prior art systems require a balancing of spatial processing against temporal processing in order to accommodate the movement of objects or the camera.

There are existing devices that transmit "live" over the internet or at least reasonably close to real-time. However, the vast majority of devices are not of a commercial grade and thus tend to lack the resolution or refresh rate that would meet the demands of a satisfactory surveillance system. Even further, these devices are not suitable for multiple network deployment and control.

There exists a need for a system that will provide improved data compression and networking capability for surveillance systems without necessitating large memory usage or large computational powers. To further provide flexibility and a more robust system it is desirable to have automated focal point adjustment for the video aspect of the system along with the capability to receive adjustment instructions from other devices on a network. It is further desirable to provide day/night functions so as to yield the best possible images. It is also desirable to include security features to protect the data that is compressed and transferred from the surveillance apparatus.

BRIEF SUMMARY OF THE INVENTION

The present invention is directed to a surveillance device that provides a wide range of monitoring and is adapted to transmit video, audio, collateral environment data, and event data over a network, utilizing a relatively low bandwidth and low power consumption, while maintaining a resolution and features that greatly enhance surveillance applications.

In one aspect, the present invention is directed to a surveillance device having a CCD camera comprising a JPEG 2000 compression component and an automated focal point adjustment component, wherein the surveillance system is networked.

In another aspect, the present invention is directed to a surveillance device that includes a digital photo-sensor, wherein said digital photo-sensor provides information on lighting conditions, and a temperature monitor component with alarming capability.

In a further aspect, the present invention is directed to a surveillance device that further includes one or more other external monitoring devices from a group consisting of: a motion sensor; a photo-sensor; a temperature monitor; a microphone; and an opto-coupler for outputting or inputting alarm signals.

In an even further aspect the present invention provides a day/night function that enables different aperture settings to provide well contrasted images.

BRIEF DESCRIPTION OF THE DRAWINGS

The present invention is further described with reference to the accompanying drawings, which show a particular construction of the present invention. However, it should be noted that the invention as disclosed in the accompanying drawings is illustrated for the purpose of explanation only. The various elements and combinations of elements described below and illustrated in the drawings can be arranged and organized differently to result in constructions which are still within the spirit and scope of the present invention.

DETAILED DESCRIPTION OF INVENTION

The present invention is directed to a multi-media surveillance device for use in a plethora of application environments. The surveillance device operates in conjunction with one or more data collection stations, remote viewing stations, communication devices and other security related components. More specifically, the invention provides collection, processing and transmission of informational items relevant to the monitoring of an area. The video aspect of the collected information is compressed utilizing an algorithm that provides optimal compression while maintaining image integrity. In an embodiment of the present invention, the surveillance device is embodied in a video camera apparatus.

Figure 1:
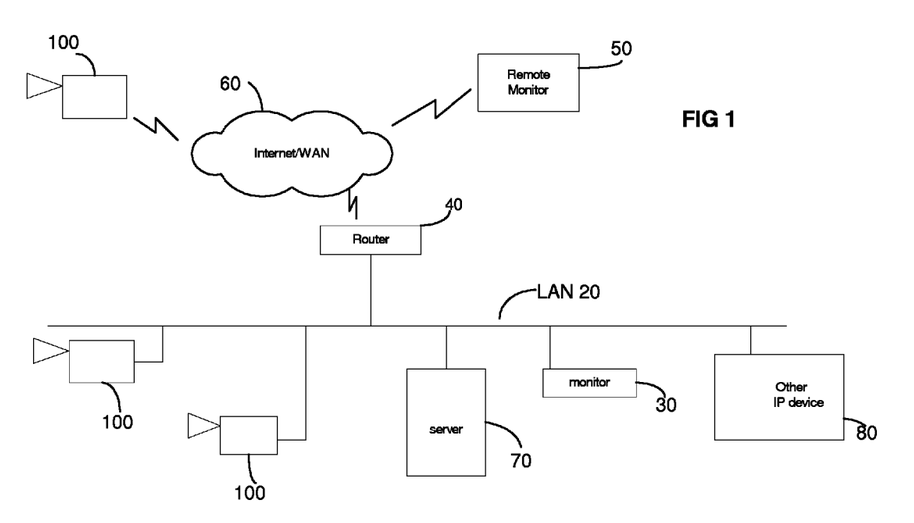
FIG. 1 illustrates a network environment in which the surveillance device of the present invention may be implemented.

An exemplary architecture of a network environment for the implementation of the video camera surveillance apparatus (Video camera 100) of the present invention is illustrated in FIG. 1, and generally designated as network 10. As would be appreciated by one skilled in the art, the topology of network 10 is determined by the geographic situation and layout of an installation environment. In other words, the number of Video cameras 100, the interconnection of network devices, the number of network devices, the connection type of the network devices and so on.

As shown, the network 10 includes a Local Area Network (LAN) 20 segment, a Wide Area Network (WAN)/Internet 60 segment and a plurality of network devices. The network devices may be of a hard-wired or wireless configuration. The term network 10 is used interchangeably herein to mean the entire network as shown or any segment thereof i.e. LAN 20, WAN 60, unless specifically identified otherwise. The network 10 includes one or more video cameras 100 that may be in operative communication with a server 70, a local monitoring station 30, a remote monitoring station 50 and any number of other Internet Protocol (IP) devices 80. The communication server 70 may serve as a central repository for data obtained from the video cameras 100 or in anyone of a number of roles typically provided in any traditional client-server environment. The monitoring station 30 may also collect data or merely be used to view data in real time, receive alarm notifications and/or provide configuration to the video camera 100.

A router 40 provides connectivity between the LAN 20 and Internet 60 segments of the network 10. It should be noted that the location of a video camera 100 may be geographically remote to that of the LAN 20 as illustrated by the remote connection to the internet 60. For that matter, the video camera 100 may be roving. There could be multiple remote monitoring stations 50 that could access or be accessed by any one or more of the local or remote surveillance cameras 100. In other words, geographic location of the video camera 100 is completely transparent.

Information that is captured by the video camera 100 may be provided to any one or more devices on the network 10 that support a common protocol with the video camera 100 and have the necessary security access. These network devices may query the video camera 100 or otherwise initiate communication. Conversely, the video camera 100 may initiate specific communication or provide broadcast of informational items to pre-designated devices.

Having described an environment for the implementation of the video camera 100 of the present invention, the specific details of the video camera 100 will be discussed next. However, the features, use and novelty of the present invention may best be understood by considering an exemplary situation and instance in which the surveillance video camera 100 would be advantageous.

Consider a hostage situation or other similar standoff, in a school building or other structure having multiple corridors, rooms, stairwells, floors, exits and ground areas. It would be advantageous for law enforcement or any other intervening body to have the ability to properly assess the site, and gain as much insight as possible into the current state of affairs. It is likely that such a situation will involve multiple agencies that would also need similar or related information. Video camera 100 of the present invention could have been widely installed in various locations throughout the building and grounds of the school. As will be described in further detail later in this document, the Video camera 100 of the present invention can be deployed without the typical rigor that is associated with installation of network devices or other camera systems. The video camera 100, will allow the delivery and review of detailed and quality site informational data, which can include images, sounds, and other environmental information. The video camera 100 lends itself to collaboration among the various agencies by enabling simultaneous access using widely available protocols. Privacy and the integrity of the site related data is maintained by security measures implemented in the camera.

Another application scenario for the present invention may be in the monitoring or assessment of a potentially unsafe environment, such as a production facility following a chemical spill, or a labyrinth of tunnels or pipelines that may contain fumes, smoke or fire. In this situation as well, the deployment, imaging functions, security and particularly the alarm notification features of the video camera 100 along with the ability to support chemical/environmental sensor would be invaluable, as will become apparent later in this description.

Figure 2A:
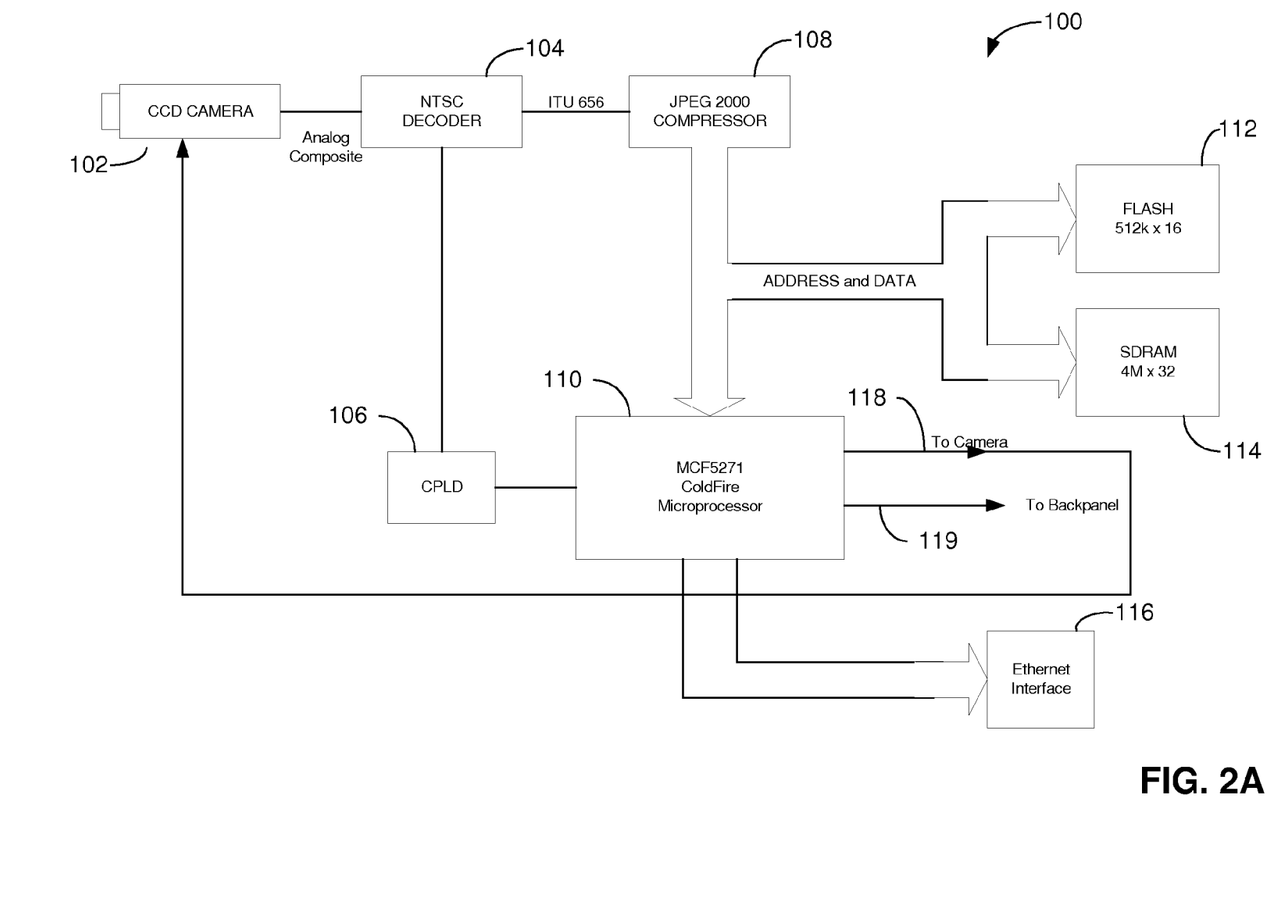
FIG. 2A illustrates a block diagram of the surveillance device of the present invention.

Turning now to the details of the video camera 100, FIG. 2 illustrates a block diagram of an embodiment of the video camera 100 apparatus of the present invention. As shown in FIG. 2, the video camera apparatus 100 comprises a Charge Couple Device (CCD) camera 102, an NTSC decode 104, a Complex Programmable Logic Device (CPLD) 106, a JPEG 2000 compressor 108, a Microprocessor 110, flash memory 112, SDRAM 114 and a network interface 116. In another embodiment, a solid state imager may be directly coupled to JPEG 2000 Compressor 108 thus eliminating the NTSC device 104. The CCD camera 102 produces an analog composite video signal. The image sensor employed by most digital cameras is a charge coupled device (CCD). Some cameras use complementary metal oxide semiconductor (CMOS) technology instead. Both CCD and CMOS image sensors convert light into electrons. It should be understood that while the term camera is used herein, the term is meant to include all camera technology as well as CCD and CMOS camera units and other state-of-the-art imaging devices. The analog composite of the CCD 102 is provided to the NTSC decoder 104. The NTSC decoder works in conjunction with the CPLD 106, to produce digital video signals according to ITU 656 standard. The CPLD 106 provides additional digital logic functions to support the memory devices of the video cameral 100 and allows communication with the NTSC decoder 104.

The ITU656 (BT.656) standard describes a digital video protocol for streaming uncompressed PAL or NTSC Standard Definition TV. The protocol supports interlaced video data, streaming each field separately. The ITU656 protocol may be used to send video frames to an output Digital/Analog Converter (DAC) Integrated Circuit for TV display. Alternately, an ITU656 stream may be output from an Analog to digital converter video capture Integrated Circuit (e.g. Philips SAA7113H chip) for further signal processing. In an embodiment of the present invention, the ITU 656 stream is provided to a JPEG 2000 compressor 108, such as Analog Devices' ADV 202.

The specifics and details of the operation of the JPEG 200 compressor 108 are outside the scope of the invention and will not be discussed in any great detail. Generally, JPEG 2000 is a wavelet-based image compression standard created by the Joint Photographic Experts Group committee to supersede their original discrete cosine transform-based (DCT) JPEG standard. JPEG 2000 can operate at higher compression ratios without generating the characteristic 'blocky and blurry' artifacts of the original DCT-based JPEG standard. It also allows more sophisticated progressive downloads or transfer of data. The advantages and details of JPEG 2000 are known in the art and generally include: Better image quality at the same file size; 25%-35% smaller file sizes at comparable image quality; Good image quality even at very high compression ratios, over 80:1; Lossless compression mode; Transparency and translucency (alpha-channel) support; and an easy way to get ¼, ⅛, 1/16, etc., of the original image.

In other words, the JPEG2000 compressor 108 enables images to be compressed with the state-of-the-art compression technology and yet have the full translucency information preserved. The application of JPEG 2000 to the camera 100 of the present invention allows for small file sizes and intra-frame compression, which facilitates transmission and manipulation of captured data. The output of the JPEG2000 processor 108 is available for storage, further processing and/or transmission, utilizing the Flash memory 112, the synchronous dynamic random access memory (SDRAM) 114 and the microprocessor 110.

The microprocessor 110 provides control and programming for the video camera 100 through pre-programmed logic. Specific functions and attributes of the video camera 100 that will be discussed later herein, are provided by programmed logic that is executed by the microprocessor 110.

The flash memory 112 is utilized as non-volatile storage for an operating system and application executable program(s). After power up of the camera 100, the application program is transferred from flash memory 112 and executed in SDRAM 114 to achieve faster operating speeds. In one aspect of the present invention, the SDRAM 114 may be utilized as a circular buffer to enable continuous data capturing. In other words, data would be captured even prior to the occurrence of a triggering event i.e. pre-event recording.

In another aspect of the present invention, the video camera 100 includes an auto-focus feature. This feature limits the need for manual calibration of the camera 100. As would be appreciated by one skilled in the art, there are two methodologies that may be employed for auto-focus systems i.e. active and passive implementations. In the classic active implementation, the camera emits some signal, such as sound waves. The sound wave emission is utilized to detect the distance of the subject from the camera and that information is then used to adjust focus.

In an embodiment of the present invention, active auto-focus is implemented in the video camera 100. The auto-focus implementation utilizes an infrared signal instead of sound waves. The infrared signal provides an advantage over sound waves, with respect to subjects that are within approximately 20 feet (6 meters) or so of the video camera 100. The Infrared based system uses a variety of techniques to judge the distance of a subject. Such techniques may include triangulation, amount of infrared light reflected from the subject, or time for the reflection of the signal.

Passive auto-focus is another methodology that may be utilized in another implementation of the invention. Typically, passive auto-focus is commonly found on single-lens reflex (SLR) auto-focus cameras, determines the distance to the subject by computer analysis of the subject's image itself. A passive auto-focus camera actually looks at the scene and drives the lens back and forth searching for the best focus.

A typical auto-focus sensor is a charge-coupled device (CCD) such as in the CCD camera 102 of the present invention. The CCD 102 provides input to algorithms that compute the contrast of actual picture elements. The CCD 102 typically comprises a single strip of 100 or 200 pixels. Light from a scene hits this strip and the microprocessor looks at the values from each pixel to determine the best representation.

In a further aspect of the present invention, the microprocessor 110 provides feedback to and control of the CCD camera 102 as illustrated by the connection 118. The microprocessor 110 also provides connectivity for RS 232 or 422 serial devices via a port 119. The serial port 119 may be located on the back panel of the video camera 100. Other Input/Output (I/O) devices supported by the video camera 100 are interfaced to the microprocessor 110. The I/O devices may include any number or type of sensors or outputs that provide signals of environmental conditions in the vicinity of the camera. The environmental conditions may then be provided to or acquired from the video camera 100 by monitoring stations 30, 50 or other network compatible devices.

Figure 2B:
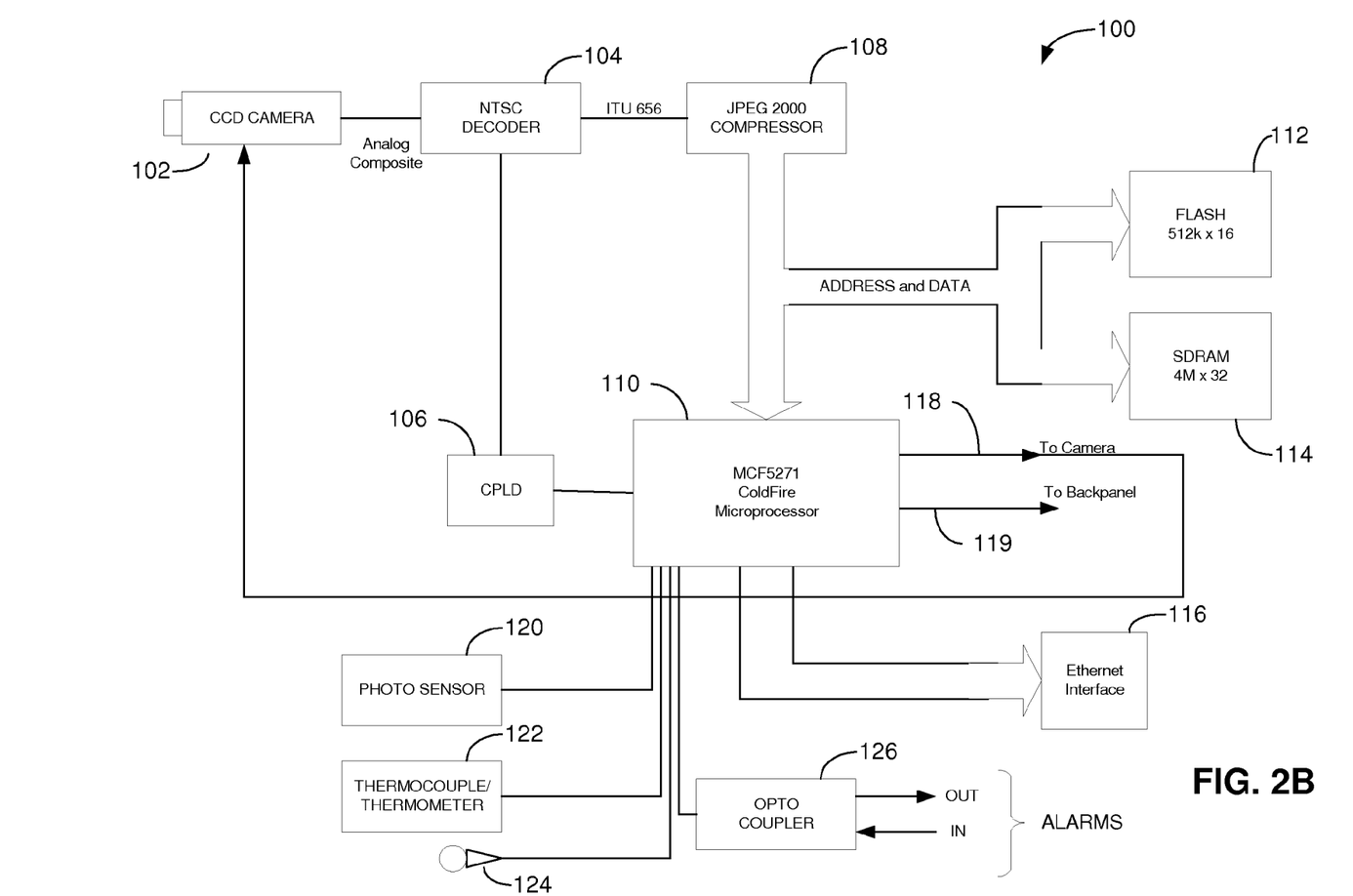
FIG. 2B illustrates a block diagram of an embodiment of the surveillance device of the present invention with optional components.

In a further embodiment of the present invention, as illustrated in FIG. 2B, I/O devices include a photo sensor 120, a temperature device 122, and a microphone 124. The I/O devices may be connected to the processor 110 to capture relevant data in the locale of the camera 100. The photo sensor 120 and temperature device 122 may be located on an optionally removable plug-on printed circuit board. The photo sensor 120 enables the camera 100 to detect lighting conditions and make adjustments as necessary for night or day settings and thus improve image quality. Such adjustments include but are not limited to camera aperture and iris settings. The camera 100 is able to operate at a minimum illumination of approximately 0.10 lux at F1.8 and ¼ see for NTSC video.

The temperature device 122, which may be a thermocouple, thermometer, temperature monitoring circuit or other heat sensing device captures ambient temperature conditions and provides an appropriate signal to the processor 110. The temperature device 122 can be queried by the processor 110 for ambient temperature conditions. The processor 110 is programmed to issue an alarm when programmable temperature limits are reached or exceeded or within a specified range. Alarm notification may then be provided as, signals to the backplane of the video camera 100, Ethernet based alerts, or triggers for other events/action by the processor 110. The video camera 100 is programmable to generate an alarm output based on one or more detections including, motion, temperature and ambient light changes. The alarm output may be utilized to activate an alarm light, solenoid, siren or otherwise act as a trigger to some other device.

The microphone 124 or other audio sensor captures audio data, thus allowing digital audio to be added to a video stream.

An opto-coupler 126 may be used to provide electrical isolation for the connectivity of certain device types to the video camera 100. For example a loud speaker or other such enunciation device may be connected to the opto-coupler 126 for enunciation of alarm signals. Alarm signals from an external or third party device may also be connected to the camera 100 via the opto-coupler 126.

The network interface 116 provides Ethernet connectivity for the video camera 100, thus enabling any of the previously described signals or communications to be utilized on the network. The network interface 116 also provides the analog line drivers and coder/decoder functions for communication on the 10/100 BaseT Ethernet link. As would be understood by one skilled in the art, other connectivity interfaces that would support one or more other network protocols that enable bi-directional communication, device identification and addressing, may be utilized without departing from the scope of the present invention. In the preferred embodiment of the present invention, Transmission Control Protocol/Internet Protocol (TCP/IP) and Dynamic Host Configuration Protocol (DHCP) protocols are supported by the camera 100. The support for dynamic IP addressing of the camera 100 facilitates simplified deployment and eliminates cumbersome configuration of each camera 100. Even further, DHCP enables the camera to work right out of the box and prevents problems that may be associated with address conflicts when deploying multiple cameras.

The camera 100 provides support for the full Internet protocol (IP) suite, which includes Address Resolution Protocol (ARP), User Datagram Protocol (UDP), Hypertext Transfer Protocol (HTTP), Post Office Protocol version 3 (POP3), Point-to-Point Protocol (PPP), domain name server (DNS), Bootstrap Protocol (BOOTP), Internet Cache Protocol (ICP), File Transfer Protocol (FTP), Internet Group Management Protocol version 2 (IGMP V2), Simple Mail Transfer Protocol (SMTP) and simple network management protocol (SNMP). As would be understood by one skilled in the art, the protocols supported by the camera 100 enable participation, interfacing and functions that are inherent to the various protocols. For example, SMTP support enables the camera 100 to interact with electronic mail (e-mail) servers as an e-mail client that can send and receive messages over the internet. UDP allows faster and more efficient transfer for many lightweight or time-sensitive data items from the camera 100 to other network devices. In a further example, SMTP and SNMP allow the camera 100 to provide alarm notification over the Ethernet network connection. For example, an alarm notification may be provided via e-mail to a user or via a text message to a hand held device.

Another feature and aspect of the present invention is the data security that is provided and supported by the camera 100. Specifically, the camera 100 provides Advanced Encryption Standard (AES) encryption. Communication between the camera 100 and any network devices or other digital video recorder (DVR) is AES encrypted. Thus making the camera suitable for high security applications. The present invention permits authorized access to the environmental sensors and surveillance data. The present invention also allows secure configuration or reconfiguration of the video camera 100 from any network 10 access point.

Yet another aspect of the present invention is the support for multiple frame rates. The camera 100 specifically supports rate of approximately 30, 15, 10 and 5 frames per second (fps).

An even further aspect of the present invention is that the video camera 100 operates at approximately 10.6V-13.8 VDC or 24 VAC (+/−10%) with a total power consumption of approximately six Watts (6 W), while providing all the features described earlier.

In one embodiment of the present invention, a video camera 100 is provided having the following specifications Features
    Autofocus
    DHCP Compliant
    AES encryption
    40× Zoom (10×Optical, 4× Digital)
    JPEG2000 Compression
    Motion Detection
    6 W Power Consumption
    0.10 Lux Minimum Illumination
    Ethernet Alarm notification (SNMP Traps or SMTP Messages)
    Simple Web Based Setup & Configuration—Password Protected
    10/100BaseT Ethernet Connection
    Multiple Frame Rates—(30, 15, 10, 5 fps)
    Multiple Resolutions—(720×486, 720×243, 360×243, 180×121 & 90×60)

Figure 3A:
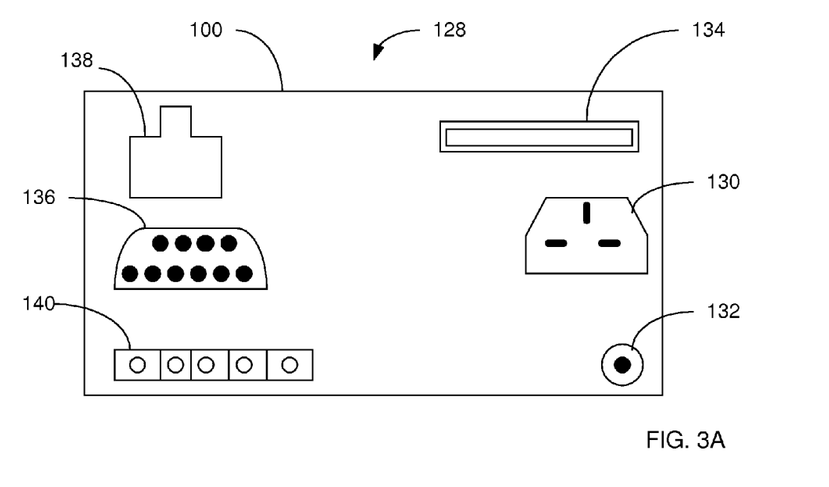
FIG. 3A is an illustration of a back panel of the surveillance device of the present invention.

Accessories
    Built-in Microphone
    Temperature Monitor—Allows creation of alarms to monitor ambient temperature
    Light Sensor—Automatically sets Day/Night mode and adjusts for type of lighting Interfaces for certain features of the video camera 100 described above along with certain basic interfaces are located on the back panel 128 as illustrated in FIG. 3A. As shown, there is an AC power supply connector 130, a DC power connector 132, a memory card interface 134, a serial interface 136, an RJ45 interface 138 and a connector strip 140.

As described earlier the video camera 100 may be powered by an A/C or DC supply, which may be connected to the appropriate ports 130,132 respectively. In order to support stand alone operation or to provide additional memory, the memory interface 134 is provided to allow the use of memory cards. The serial interface 136 allows serial communication with the video camera 100. The RJ45 interface 138 is provided for connectivity to an Ethernet network as earlier described. The connector strip 140 enables non-network output signals to be provided from the video camera 100 to other devices, such as the loud speaker or alarm light. Certain portions of the strip 140 serve as input connectors for external signals to the video camera 100, such as a trigger signal.

Figure 3B:
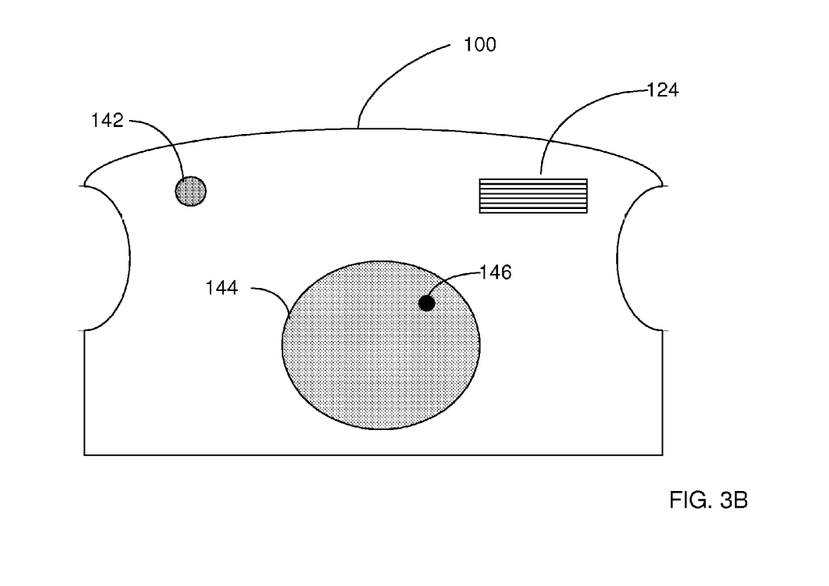
FIG. 3B is an illustration of a front view of the surveillance device of the present invention.

FIG. 3b illustrates an exemplary front view of the video camera 100. The optional microphone 124 may be located on this front surface. Additionally, there is an aperture 142 for emitting light or sound waves to facilitate the auto-focus feature described earlier. Lens 144 may incorporate a light source 146 for auto-focus or to indicate that the video camera is in operation.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This aspect is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

What is claimed is:

1. A network compatible, multimedia surveillance device having support for dynamic addressing, the surveillance device adapted to acquire and provide digital data items on a TCP/IP network, the surveillance device comprising:
    an image capture device for acquiring video images as digital data items;
    a processor component for processing the digital data items;
    a JPEG 2000 compression component;
    an encryption component for encrypting all communications between the surveillance device and said TCP/IP network; and
    an automated focal point adjustment component;
    wherein the surveillance device is adapted to support dynamic IP addressing;
    wherein said JPEG 2000 compression component is in operative communication with said processor component to provide compression of the video images;
    wherein said focal point adjustment component is adapted to receive adjustment parameters from a host computer or other network device attached to the TCP/IP network and operates in cooperation with said processor component and image capture device to make focal point adjustments in response to parameters received from said host computer or said other network device to improve quality of video images being acquired; and
    wherein said processor component is adapted to receive frame rate settings from said host computer or said other network device.

2. The surveillance device of claim 1 further comprising a digital photo-sensor, wherein said digital photo-sensor provides information on lighting conditions to said processor component to influence aperture and iris settings in said image capture device.

3. The surveillance device of claim 1 further comprising a temperature monitoring component, said temperature monitoring component capturing the temperature readings of the ambient environment of the surveillance device and providing said information to other network devices via the IP network.

4. The surveillance device of claim 3 having said temperature monitoring component adapted to provide an alarm signal to the IP network when ambient temperature readings exceed one or more programmable temperature limits whereby said alarm signal is available to other network device.

5. The surveillance device of claim 4, wherein the processor component is adapted to activate upon the occurrence of said alarm signal or one or more from a group consisting of: a network signal, an alarm light, a solenoid, and a siren.

6. The surveillance device of claim 4, wherein said alarm signal is an Ethernet alarm notification that also provides an SMTP message.

7. The multimedia surveillance device of claim 1, wherein the multimedia surveillance device is adapted to support dynamic multiple frame rates, and wherein said frame rates may be adjusted by a network device external to the multimedia surveillance device.

8. The multimedia surveillance device of claim 1 further comprising:
    a pre-event recording component, wherein a circular buffer provides data capture prior to the occurrence of a trigger signal that signifies the starting moment for image capture.

9. A video camera apparatus comprising:
    a CCD camera;
    an NTSC decoder;
    a JPEG 2000 compression device;
    a microprocessor;
    a network interface;
    a memory store; and
    a complex programmable logic device; said logic device connected in communication to said NTSC decoder and said microprocessor, to provide digital logic functions;
    said CCD camera connected in communication to said NTSC decoder to provide analog composite video, and to said microprocessor;
    said NTSC decoder connected in communication to said compression device and said complex programmable logic device;
    said compression device connected in communication to said memory store and said microprocessor, to provide compressed video data;
    said microprocessor adapted to communicate through said network interface to one or more networked devices for sending images and data, and dynamically receiving frame rate information and focal point adjustment parameters, from a device on the IP network in real time;
    said memory store further comprising:
    a flash memory for nonvolatile storage of an operating environment and application instructions; and
    a synchronous dynamic random access memory for interactive execution of said application instructions with said microprocessor and for providing pre-event recording;
    said microprocessor further adapted to communicate via a serial interface to one or more external devices from a group consisting of: a motion sensor; a photo-sensor; a temperature monitor; a microphone; and an opto-coupler.

10. A video camera apparatus comprising:
    means for capturing images and converting the images into digital format;
    means for implementing compression of the converted images;
    means for providing auto-focus functions on said camera to enhance the quality of the captured images;
    means for providing secure connectivity and encrypted communication to a TCP/IP network means for supporting dynamic IP addressing;

an environment sensor, wherein signals from said environment sensor are processed by the video camera and made available for communication to said TCP/IP network;

means for providing notification of one or more alarm signals in connection with the signals from said environment sensor to devices on said IP network; and means for receiving from an external device on said TCP/IP network focal point adjustment parameters.

11. The video camera of claim 10 wherein said means for implementing compression implements JPEG 2000 compression.

12. The video camera apparatus of claim 10, further comprising means for automatic detection of day or night.

13. The video camera apparatus of claim 10 wherein said environment sensor is a temperature sensor.

14. The video camera apparatus of claim 10 wherein said environment sensor is a sound detection device.

15. The video camera apparatus of claim 10 further comprising means for providing a non-network signal in connection with said one or more alarms, wherein said non-network signal may be used to activate a notification device external to said video camera.

16. A network compatible, multimedia surveillance device having support for dynamic addressing, the surveillance device adapted to acquire and provide digital data items on an IP network, the surveillance device comprising:

an image capture device for acquiring video images as digital data items;

a processor component for processing the digital data items;

a JPEG 2000 compression component;

an encryption component for encrypting communications between the surveillance device and said IP network; and an automated focal point adjustment component;

a pre-event recording component, wherein a circular buffer provides data capture prior to the occurrence of a trigger signal which signifies the starting moment for image capture;

wherein said JPEG 2000 compression component is in operative communication with said processor component to provide compression of the video images;

wherein the multimedia surveillance device is adapted to support dynamic multiple frame rates, and wherein said frame rates may be adjusted by a network device external to the multimedia surveillance device; and wherein said focal point adjustment component is adapted to receive adjustment parameters from a host computer or other network device attached to the IP network and operates in cooperation with said processor component and image capture device to make focal point adjustments in response to parameters received from said host computer or said other network device to improve quality of video images being acquired.

* * * * *